United States Patent [19]
Mersky et al.

[11] Patent Number: 6,119,106
[45] Date of Patent: Sep. 12, 2000

[54] METHOD AND APPARATUS FOR FACILITATING CUSTOMER PAYMENTS TO CREDITORS FROM A REMOTE SITE

[76] Inventors: Randy Mersky, 1861 Middlebridge Dr., Silver Spring, Md. 20906; Milton Mersky, 7420 Westlake Ter., #507, Bethesda, Md. 20817

[21] Appl. No.: 08/979,777

[22] Filed: Nov. 26, 1997

[51] Int. Cl.[7] ..................................................... G06F 17/60
[52] U.S. Cl. ............................................................. 705/40
[58] Field of Search ................................. 705/40, 41, 42, 705/44; 235/370, 380

[56] References Cited

U.S. PATENT DOCUMENTS

| | | | |
|---|---|---|---|
| 4,694,397 | 9/1987 | Grant et al. | 705/42 |
| 4,799,156 | 1/1989 | Shavit et al. | 705/26 |
| 4,823,264 | 4/1989 | Deming | 705/39 |
| 4,858,121 | 8/1989 | Barber et al. | 705/39 |
| 4,947,028 | 8/1990 | Gorog | 235/380 |
| 5,007,084 | 4/1991 | Materna et al. | 380/24 |
| 5,025,373 | 6/1991 | Keyser, Jr. et al. | 380/24 |
| 5,050,207 | 9/1991 | Hitchcock | 379/93.19 |
| 5,220,501 | 6/1993 | Lawlor et al. | 380/24 |
| 5,252,811 | 10/1993 | Henochowicz et al. | 235/379 |
| 5,283,829 | 2/1994 | Anderson | 380/24 |
| 5,326,959 | 7/1994 | Perazza | 235/379 |
| 5,336,870 | 8/1994 | Hughes et al. | 235/379 |
| 5,351,994 | 10/1994 | Pollin | 235/379 |
| 5,383,113 | 1/1995 | Kight et al. | 705/40 |
| 5,424,938 | 6/1995 | Wagner et al. | 705/42 |
| 5,465,206 | 11/1995 | Hilt et al. | 705/40 |
| 5,496,991 | 3/1996 | Delfer, III et al. | 235/379 |
| 5,504,677 | 4/1996 | Pollin | 705/45 |
| 5,546,303 | 8/1996 | Helbling | 235/375 |

OTHER PUBLICATIONS

"EUA is taking its payment system to the bank", Electrical World v.205 (Jul. '91), p. 15.

Primary Examiner—Emanuel Todd Voeltz
Assistant Examiner—Thomas A. Dixon

[57] ABSTRACT

A system for facilitating customer payments to creditors from a remote site includes computer systems located at respective agent, service provider and creditor sites. The service provider or host computer system is in selective communication with the agent and creditor computer systems and processes transaction information. A customer typically visits an agent site (e.g., a retail establishment) and tenders payment, preferably manually, in response to receiving a billing statement from a creditor. The payment transaction is entered into the agent system wherein information for all payment transactions at that agent site is maintained in a transaction file. The agent system generates a receipt for the customer at the completion of the transaction. Each agent system transfers a respective transaction file to the host system daily at a specified time associated with the respective agent system, preferably at the end of a day, wherein the host system processes the transaction files to generate a closeout report and a creditor report for each creditor indicating the payment activity at the agent sites. The creditor reports are transferred to the creditor systems wherein customer accounts may be updated based on the payment information within the creditor reports. The closeout report includes information related to the payment activity at each agent site and is generated by the host system at another specified time, preferably after the transaction information has been received by the host system from each of the agent systems. The service provider typically pays the creditors via electronic fund transfer or other conventional payment methods. The agents pay the service provider in a similar fashion while remitting to the service provider a portion of a service fee charged to the customer.

28 Claims, 9 Drawing Sheets

F1 CUSTOMER BILL-PAY
F2 STORE OPTIONS
F3 SYSTEM OPTIONS
F4 DETAIL REPORT
F5 SUMMARY REPORT
F6 CUMULATIVE REPORT
F7 UTILITY SETTINGS

FIG.6

| BILL-PAY ENTRY ||||
|---|---|---|---|
| CUSTOMER NAME: || CUSTOMER NUMBER: ||
| CUSTOMER ADDRESS 1: | F1 DONE | F2 ADD | F3 EDIT |
| CUSTOMER ADDRESS 2: | PRESS <ESC> KEY TO QUIT |||
| CITY: | STATE: | ZIP CODE: ||
| UTILITIES | ACCOUNT NUMBER | AMOUNT | FEE |
|  |  |  |  |
|  |  |  |  |
|  |  |  |  |
|  |  |  |  |
|  | TOTALS: |  |  |

FIG.7

| CUSTOMER INFORMATION ||||
|---|---|---|---|
| LAST NAME: | FIRST NAME: |||
| ADDRESS LINE 1: ||||
| ADDRESS LINE 2: ||||
| CITY: | STATE: | ZIP CODE: ||
| LAST ACTIVITY: MM/DD/YY TIME | | CANCEL | OK |
| LAST MODIFIED: MM/DD/YY TIME | | | |

FIG.8 ⟵ 15

| CHANGE FUNCTION ||
|---|---|
| TOTAL | |
| AMOUNT TENDERED | |
| CHANGE DUE | |

```
                                                            ┌─ 19
         BILL PAYMENT RECEIPT

<CALENDER DAY: MM/DD/TT>        <TIME HH:MM:SS>
         <STORE NAME>                    STORE #: <STORE NUMBER>
         <CUSTOMER NAME>                 <CUSTOMER NUMBER>

FIG.10   UTILITY NAME      ACCOUNT#              AMOUNT
         <UTILITY 1 NAME>  <ACCOUNT NUMBER>      $<AMOUNT PAID>
         <UTILITY 2 NAME>  <ACCOUNT NUMBER>      $<AMOUNT PAID>

TOTAL: $<TOTAL AMOUNT WITHOUT FEES>
         FEE: $<FEE AMOUNT SET BY SALES REP.>
         TOTAL PAID: $<TOTAL AMOUNT WITH FEES>
```

```
                                                            ┌─ 21
         TRANSACTION DATE: <MM/DD/YYYY>
         TRANSACTION TIME: <HH:MM>
         TRANSACTION NUMBER: <YYYYJJJAAAAAAAATTTTTTT>
         STORE NUMBER: <STORE NUMBER>
FIG.11   CUSTOMER NUMBER: <CUSTOMER NUMBER>
         CUSTOMER NAME: <LAST NAME, FIRST NAME>
         UTILITY NUMBER: <UTILITY NUMBER>
         CUSTOMER UTILITY ACCOUNT NUMBER: <ACCOUNT NUMBER>
         AMOUNT PAID: <AMOUNT PAID>
```

```
                                                            ┌─ 23
         UTILITY REPORT
         <UTILITY NAME>
         <ADDRESS>                        <MM/DD/YY>

FIG.12   NAME               ACCOUNT NUMBER     AMOUNT
         <CUSTOMER 1 NAME>  <ACCOUNT NUMBER>   <AMOUNT PAID>
         <CUSTOMER 2 NAME>  <ACCOUNT NUMBER>   <AMOUNT PAID>
         <CUSTOMER 3 NAME>  <ACCOUNT NUMBER>   <AMOUNT PAID>

TOTAL PAID <TOTAL AMOUNT DUE TO UTILITY>
```

CLOSEOUT REPORT FOR TRUSTEE # <AGENT NUMBER>
END OF DAY REPORT FOR <MM/DD/YY>
REPORT <CALENDER DAY/HH:MM:SS>

UTILITY NAME                ACCOUNT NUMBER
AMOUNT PAID                 TIME
CUSTOMER #                  CUSTOMER NAME
________________________________________________

<UTILITY 1 NAME>            <ACCOUNT NUMBER>
$<AMOUNT PAID>              <TIME HH:MM:SS>
<CUSTOMER NUMBER>           <CUSTOMER NAME>
<UTILITY 2 NAME>            <ACCOUNT NUMBER>
$<AMOUNT PAID>              <TIME HH:MM:SS>
<CUSTOMER NUMBER>           <CUSTOMER NAME>
<UTILITY 3 NAME>            <ACCOUNT NUMBER>
$<AMOUNT PAID>              <TIME HH:MM:SS>
<CUSTOMER NUMBER>           <CUSTOMER NAME>

TOTAL TRANSACTIONS: <NUMBER OF TRANSACTIONS>
TOTAL $ (FACE & FEES): $<TOTAL AMOUNT PAID>
TOTAL $ (FACE): $<TOTAL AMOUNT WITHOUT FEES>
TOTAL $ (FEES): $<TOTAL FEE AMOUNT>
FEES DUE AGENT: $<FEE AMOUNT AGENT KEEPS>
FEES DUE SERVICE PROV.: $<FEE AMOUNT SERVICE PROV. GETS>
TOTAL DUE SERVICE PROV.: $<TOTAL FACE+SERVICE PROV. FEES>
```

METHOD AND APPARATUS FOR FACILITATING CUSTOMER PAYMENTS TO CREDITORS FROM A REMOTE SITE

BACKGROUND OF THE INVENTION

1. Technical Field

The present invention pertains to computerized transaction processing (e.g., bill paying) systems. In particular, the present invention pertains to a computerized system for facilitating customer payments to creditors from a remote site.

2. Discussion of Prior Art

Generally, consumer creditors (e.g., utility companies, banks, credit card companies, department stores, etc.) periodically send billing statements (i.e., bills) notifying customers of account balances and requesting payment. A customer typically remits payment to the creditor in the form of a check within a reasonable period after receiving the billing statement. Alternatively, customers may arrange to have payments automatically transferred from a customer's bank account to a creditor's account by electronic transfer. This relieves the customer from performing the cumbersome task of completing and mailing a check each billing period, and incurs a savings to the customer since the customer does not need to purchase stamps to mail payments.

In addition, there are several prior art systems that facilitate customer payment of bills to creditors. For example, U.S. Pat. No. 5,220,501 (Lawlor et al) discloses a system enabling a customer to communicate with a service provider computer from a remote computer site, preferably the customer's home, to facilitate bill paying and/or banking functions. The service provider computer accesses the customer bank computer to selectively perform several banking functions (e.g., account balance inquiries, transfer of funds between accounts, etc.) and pay bills by electronically transferring funds from the customer's account.

U.S. Pat. No. 5,326,959 (Perazzo) discloses a system that enables customer payment of bills to creditors via electronic fund transfers from a customer bank account based on forms submitted by the customer to the customer bank indicating the creditor to receive payment and the payment amount.

U.S. Pat. No. 5,351,994 (Pollin) and U.S. Pat. No. 5,504,677 (Pollin) disclose a system that enables customer payment of bills to creditors by generating a draft payable to the creditor and drawn on the customer's bank account wherein the creditor executes the draft as an authorized signatory for the customer and deposits the payment in the creditor account.

The prior art suffers from several significant disadvantages. Specifically, the prior art systems generally rely on computers or other devices to enable customer payment to creditors by electronically transferring funds between customer and creditor bank accounts. However, these systems are unavailing for customers who do not have either a computer or other communication device, or a checking or other bank account. Further, prior art systems are typically limited to facilitating customer payment to creditors with a specific type of payment (e.g., electronic fund transfer), and do not accommodate customers that desire, or are only able, to pay creditors with some other form of payment, such as cash. Moreover, a customer using prior art systems typically must authorize and arranges for electronic transfer of funds with the creditor and/or bank in order to enable payment to creditors. This authorization process generally includes submission of various forms by the customer and/or creditor to the customer bank and creditor bank, thereby imposing additional burdens on the parties involved. Although creditors may have offices that are capable of receiving customer payments in various payment forms (e.g., cash), these payments must be received and processed in the creditor's offices during creditor office hours. This is especially distressing for customers that need to make emergency payments (e.g., payments due that day) to avoid lateness and/or other penalties when the creditor's offices are closed.

OBJECTS AND SUMMARY OF THE INVENTION

Accordingly, it is an object of the present invention to facilitate customer payment to creditors with various forms of payment (e.g., check, cash, credit card, etc.) from a remote site (e.g., a local retail establishment).

It is another object of the present invention to facilitate customer payment to creditors from remote sites (e.g., local retail establishments) commonly having substantial business hours, thereby enabling customers to pay creditors from remote sites during respective remote site business hours typically spanning a substantial portion of a day.

Yet another object of the present invention is to facilitate customer payment to creditors from a remote site without requiring the customer to authorize, register for, or pre-arrange the payment transaction with the creditor.

Still another object of the present invention is to reduce payment processing costs for creditors by arranging for a single payment to the creditor for numerous customer accounts.

The aforesaid objects are achieved individually and in combination, and it is not intended that the present invention be construed as requiring two or more of the objects to be combined unless expressly required by the claims attached hereto.

According to the present invention, a system for facilitating customer payment to creditors from a remote site includes a plurality of agent computer systems with each agent computer system residing at a different remote site associated with an agent (e.g., a local retail establishment), and a host computer system residing at a site associated with a service provider wherein the host computer system is configured to be in selective communication with each of the agent computer systems. A plurality of creditor computer systems typically reside at different sites associated with creditors (e.g., utility or other companies) affiliated or under contract with the service provider, wherein the creditor computer systems are preferably in selective communication with the host computer system. A customer using the system for the first time typically visits one of the remote sites and tenders payment, preferably manually, in response to receiving a creditor billing statement (i.e., bill). Information relating to the customer, including name, address and customer account number with the creditor are entered into the agent system at that remote site along with the payment amount, and a receipt containing transaction information is printed and conveyed to the customer. Each transaction for a first time customer-user of the system is processed at a remote site in substantially the same manner described above. The remote computer system at each remote site maintains information for all transactions occurring daily at that site. If a customer chooses to use the system a second or subsequent time by paying a bill at the same agent location, the stored information for that customer can be accessed and used to avoid having to obtain and process that information.

Each agent computer system transmits their daily transaction information to the host computer system at a predetermined time, preferably the closing time for the business at the respective remote site. The host system receives the transaction information from each agent system and sorts the information to create a transaction report for each creditor affiliated or under contract with the service provider. Once the transaction reports are generated, the reports are transmitted to the appropriate creditor computer systems in order to credit customer payments to the corresponding customer accounts. Alternatively, the host computer system may generate transaction reports for each creditor affiliated with the service provider, and send the reports to the creditors in any conventional manner (e.g., facsimile, ground transport mail, etc.). Creditors may use the reports to apply the customer payments to the appropriate customer accounts in any conventional manner (e.g., enter the payments into the creditor computer system). The system operator or service provider receives funds from each of the agents and pays each of the creditors via electronic fund transfer or other conventional payment form. The host system generates a closeout report containing transaction information for all transactions occurring at the respective remote sites. The report is typically printed at a predetermined time after all the transaction information has been received from the remote computer systems.

The present invention may be additionally utilized for other applications, such as purchasing money orders or telephone cards (e.g., pre-paid cards enabling the card holder to place telephone calls incurring fees up to the pre-paid amount), in substantially the same manner described above except that each of the remote computer systems includes a peripheral printer or other device to generate the money orders or telephone cards, respectively, and the transaction reports are sent to the respective money order or telephone companies.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
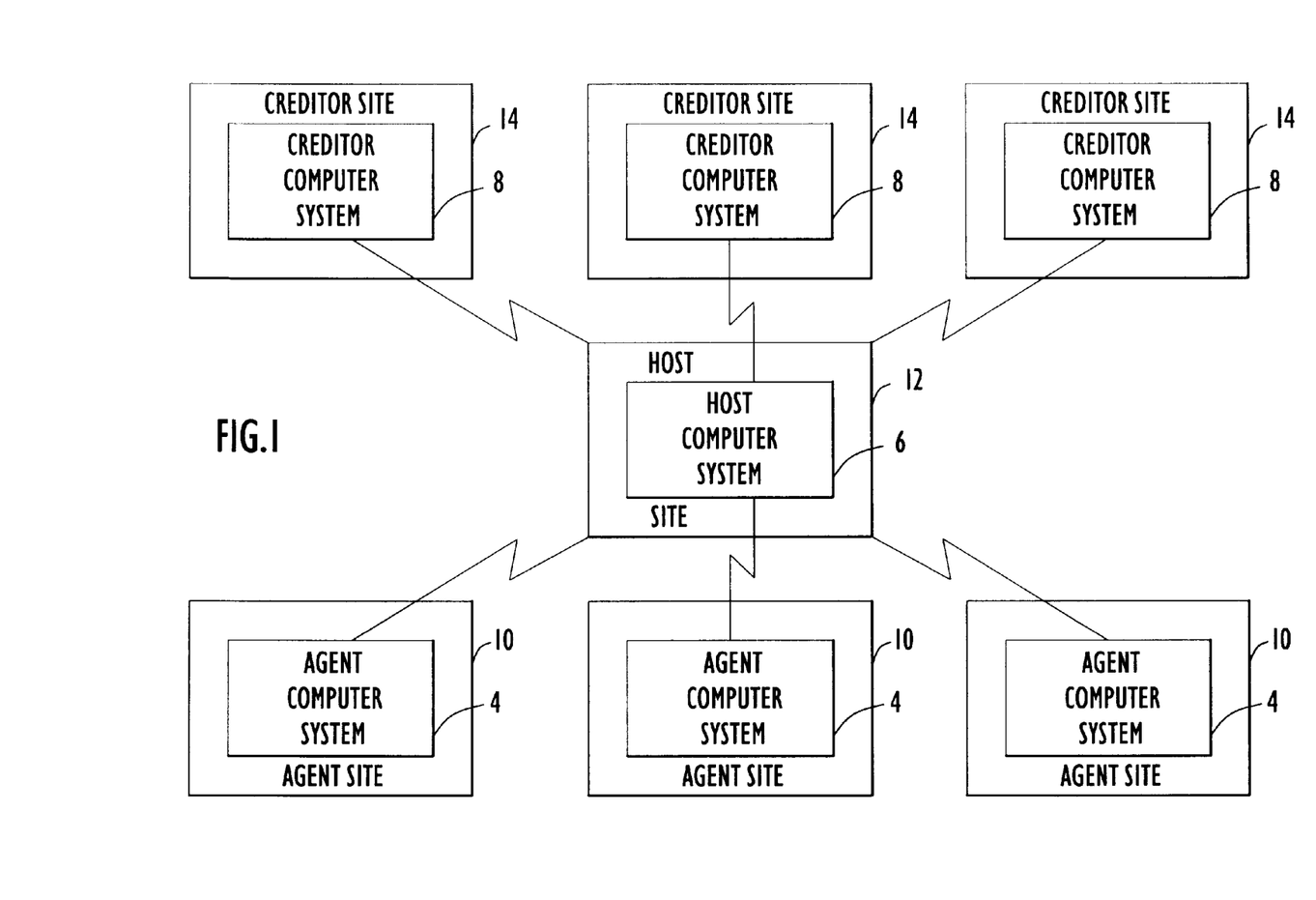
FIG. 1 is a functional block diagram of an exemplary system for facilitating customer payments to creditors from a remote site according to the present invention.

An exemplary system for facilitating customer payments to creditors from a remote site is illustrated in FIG. 1. Specifically, the system includes a plurality of agent or remote computer systems 4, and a host computer system 6 wherein the host system is in communication with each of the agent systems. Agent systems 4 typically reside at different remote or agent sites 10, preferably local retail establishments, while host system 6 resides at a service provider or host site 12 wherein customer payment transaction information from agent systems 4 is processed as described below. The service provider generally arranges for payment to creditors and installs system 4 at the agent sites. In other words, the service provider offers to customers the service of paying creditors from the agent sites. A plurality of creditor computer systems 8 typically reside at different creditor sites 14, such as utility (i.e., electric, gas, telephone, etc.) or other company sites and preferably receive processed customer payment transaction information from host system 6 as described below. Any communications media may be utilized to facilitate communications between host system 6 and each of the agent and creditor computer systems. Host system 6 is essentially the focal point wherein customer payment transaction information is received from the agent systems, processed and forwarded to the appropriate creditor systems to enable customer payments to be credited to the corresponding customer accounts. Alternatively, host system 6 may send transaction information to the creditor sites in any conventional manner, such as mail, facsimile or other transport facility. The transaction information is then utilized at respective creditor sites to credit the appropriate customer accounts. A service fee is charged to and paid by customers upon utilizing the payment service, and the service fee is divided in a prearranged manner between the agent and service provider. Any number of agents and/or creditors within the communication capabilities of host system 6 may be utilized. The agent, host and creditor computer systems are preferably implemented by conventional personal computers as described below, or larger capacity computers when the data processing requirements necessitate increased processing power.

Figure 2:
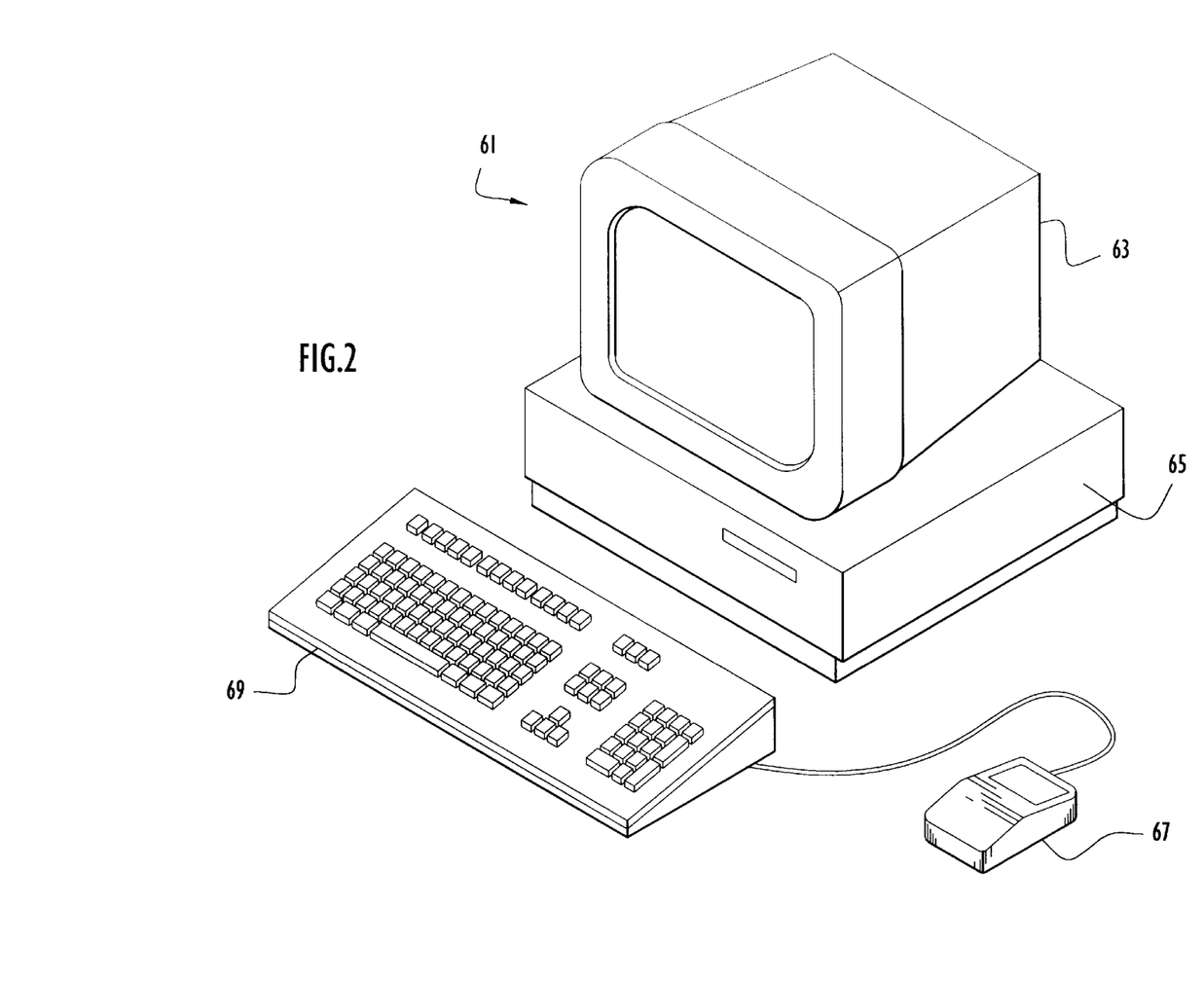
FIG. 2 is a view in perspective of an exemplary computer system employed by the present invention.

An exemplary personal computer system for implementing the agent, host and creditor computer systems is illustrated in FIG. 2. Specifically, computer system 61 is a conventional IBM-compatible or other type personal computer preferably equipped with a monitor 63, base 65 (i.e., including the processor, memories, and internal or external communication devices or modems), keyboard 69 and mouse 67. Computer system 61 includes the appropriate software to perform customer payment transaction information processing for either the agent, host or creditor system depending upon the particular utilization of the computer system (i.e., whether the computer system is implemented as an agent, host or creditor system). The computer system may utilize any of the major platforms, or operating systems such as Windows, Macintosh, Unix, DOS or OS2, and preferably includes at a minimum an Intel 80486 or equivalent processor and a substantial amount of RAM to effectively execute the software.

Operation of the present invention, and in particular, the manner in which the system processes customer payment transactions is illustrated in FIGS. 1, 3–5. Initially, a service provider obtains authorization from various creditors to receive customer payments for the creditors. The service provider and creditor computer systems 6, 8 are typically configured such that host system 6 communicates with creditor system 8 in order to forward to the creditor system customer payment transaction information associated with that creditor. Alternatively, the host system may forward the transaction information to the creditor in any conventional manner, such as mail, facsimile or other transport facilities, and therefore, may not be configured for communication with creditor systems 8. The service provider also solicits bill collection agents, preferably local retail establishments, to collect customer payments wherein the service provider supplies each agent with computer system 4, including the appropriate software and configured for communication with host system 6 as described above, to process customer payments received at the respective agent site. The agents charge the customer a service fee for receiving and processing the customer payment, and the service fee is divided between the agent and the service provider in a pre-arranged manner. Specifically, the creditors send at step 20 to their respective customers billing statements containing account balance information and a request for payment of the balance. In response to receiving the billing statement, a customer visits an agent site 10 at step 22 to pay a portion of, or the entire, account balance. The customer tenders payment, preferably manually, to an operator at the agent site and the payment is processed by agent system 4 as described below wherein the agent system maintains information relating to each customer payment transaction. The transaction information is typically transmitted to host system 6 on a daily basis as described below. Agent system 4 determines at step 24 whether or not the transaction information has been transmitted to host system 6 within the past day or other predetermined time interval. In the event that the agent system determines that the information has not been transferred to the host system, the agent system automatically disables at step 26 and is precluded from processing further customer payment transactions until the information is transferred to the host system or the agent system is reset.

When the agent system determines that the information has been transferred to the host system, information is entered into agent system 4 to process the customer payment. Typically, the agent system utilizes various screens to enable entry of a customer payment transaction. In the preferred embodiment, the agent system is driven by menus to display screens for entry of transaction information, however, the system may utilize windows or other user interfaces to enable information entry. The information is entered in appropriate screen fields via keyboard 69 (FIG. 2) or other input device (e.g., a mouse) in a conventional manner. Initially, agent system 4 is commanded to execute the customer payment processing or agent software. Executing software on the agent computer system is conventional and well known in the computer arts. The agent system initially displays a main menu screen 16 showing the agent system functions as illustrated by way of example in FIG. 6. Specifically, menu screen 16 includes several functions (i.e., Customer Bill-Pay, Store Options, System Options, Detail Report, Summary Report, Cumulative Report and Utility Settings) with each function respectively associated with a particular function key (e.g., function keys F1–F7) on keyboard 69 (FIG. 2). Depressing a particular keyboard function key initiates the corresponding function. For example, depressing the "F1" function key initiates the "Customer BillPay" function to process customer payments as described below. The "Store Options" function initiates upon depressing the "F2" function key wherein this function is password protected and requires entry of a correct password prior to function execution. The "Store Options" function is utilized by an agent operator and employs various screens to respectively change the "Store Options" password, set the service fee charged to the customer for the customer payment service, and enable or disable printing of a receipt and display of a change due screen described below. The "Systems Options" function initiates upon depressing the "F3" function key wherein this function is password protected as described above. The "Systems Options" function is used exclusively by the service provider operator and employs various screens to respectively change the "Systems Options" password and maintain information relating to an agent's name, an agent's system identification and telephone numbers, a service fee retained by the service provider (i.e., the portion of the service fee charged to the customer by an agent) and the daily times when the host system respectively receives transaction information from the agent systems (i.e., the times when the agent systems download daily transaction information to the host) and prints a closeout report as described below.

Figure 6:
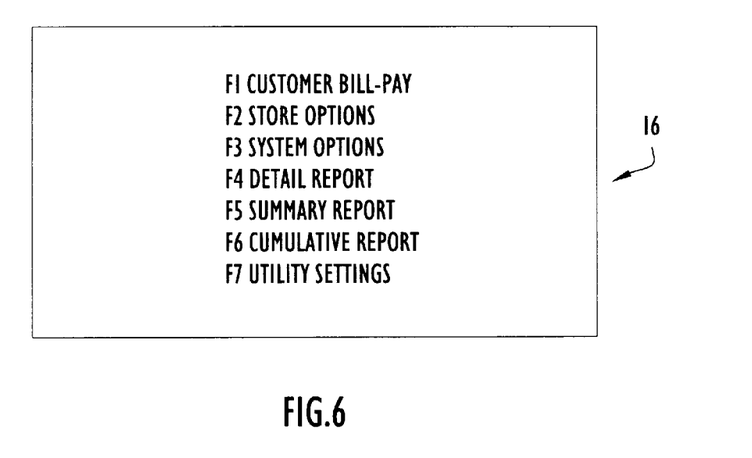
FIG. 6 is an exemplary illustration of an agent system computer screen showing a menu of functions performed by the agent computer system according to the present invention.

The agent system also includes the capability to generate a detailed and summary report for a specified date as indicated by the respective "Detail Report" and "Summary Report" functions displayed on menu 16. The detail report is generated by depressing the "F4" function key and includes information for the specified day relating to the creditor name, the customer account number, the customer name and system generated customer identification number, the amount the customer pays and the time of the transaction. Further, the detail report includes various service fees and face (i.e., amount due to a creditor excluding service fees) totals (e.g., the total of face amounts and service fees, the total face amount, the total service fees, the total service fees retained by the agent and service provider and the total payment due to the service provider (i.e., the total of face amounts and service provider fees)). The summary report is generated upon depressing the "F5" function key and includes only the date of the report and the various fee and face amount totals described above for the detail report. Further, the agent system may generate a cumulative report for a specified time period (e.g., spanning several days) as indicated by the "Cumulative Report" function displayed on menu 16. The cumulative report is generated upon depressing the "F6" function key and is similar to the summary report described above except that the cumulative report contains the fee and face amount totals for several consecutive days within the specified time period. The "Utility Settings" function initiates upon depressing the "F7" function key and enables configuration of the host system to accommodate a specific creditor or creditor system. It is to be understood that the menu may be arranged in any manner and utilize various function and/or other keyboard keys to execute a particular function.

Figure 3:
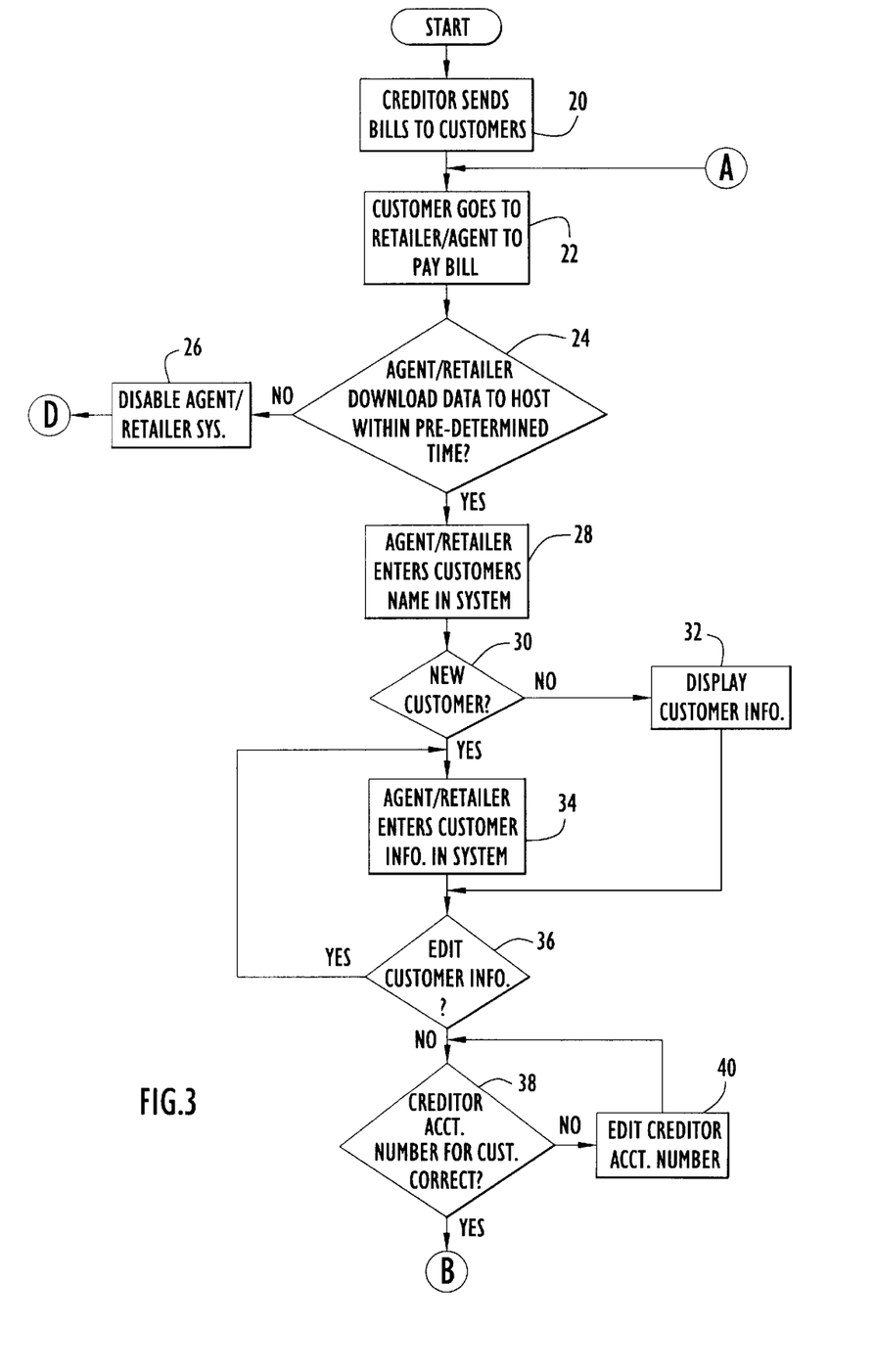
FIGS. 3–5 comprise a procedural flowchart illustrating the manner in which a customer payment transaction is processed according to the present invention.
Figure 4:
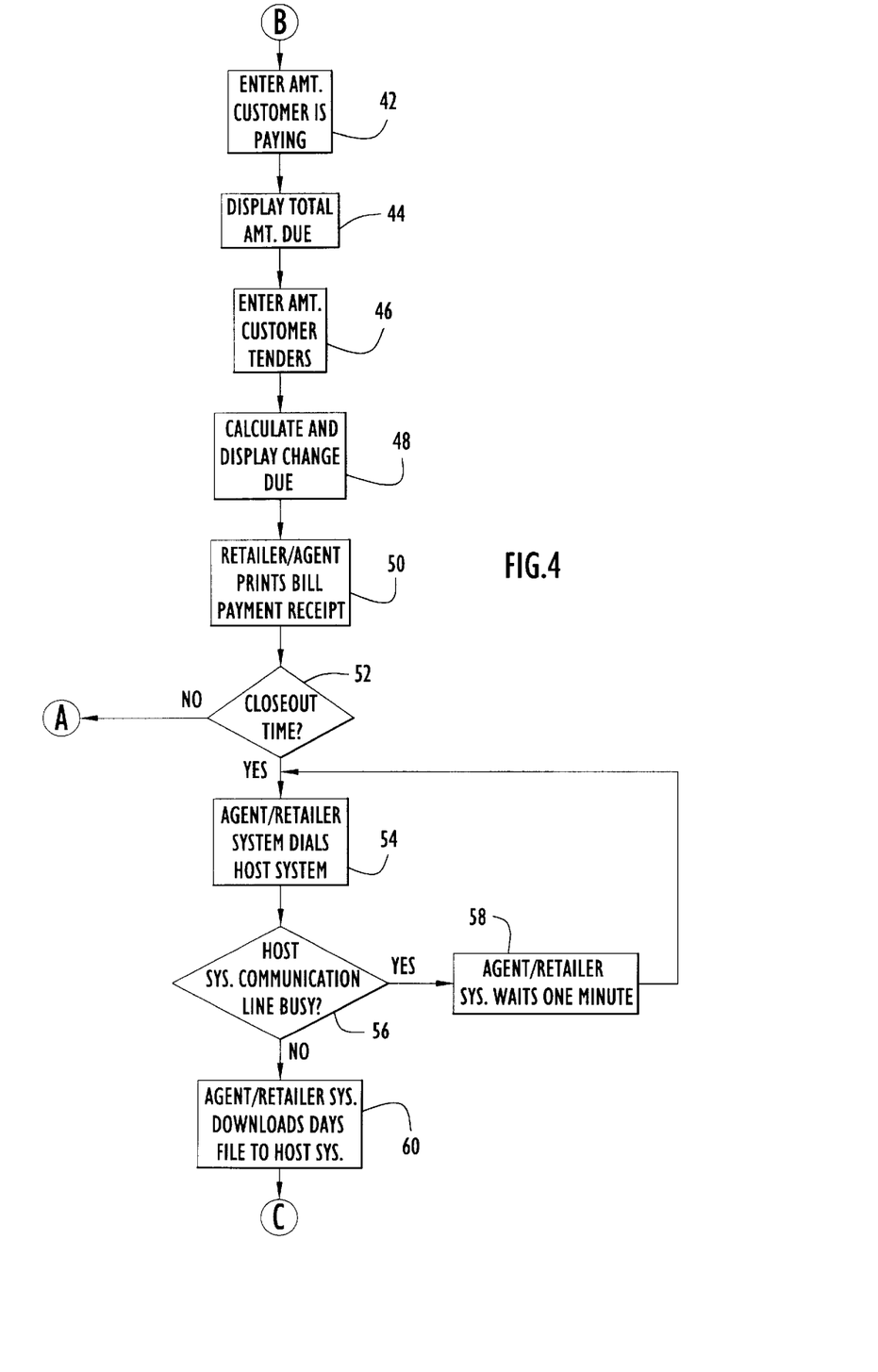

Referring back to FIG. 3, when a customer visits an agent site and tenders payment, customer information is entered into agent system 4 at step 28. Although the customer may tender payment either before or after the customer information is entered into agent system 4, payment prior to information entry is preferable. In particular, the "F1" function key is depressed from menu 16 to initiate the "Customer Bill-Pay" function wherein agent system 4 displays a customer payment screen 18 as illustrated by way of example in FIG. 7. Specifically, payment screen 18 includes fields to receive the customer name, customer identification number (i.e., this identification number is generated by agent system 4 for each customer as described below) and customer address (i.e., street, city, state and zip code wherein the screen includes fields for receiving two street addresses). In addition, screen 18 includes a table having column headings indicating the specific creditor (e.g., utility or other company), the customer account number, the amount paid by the customer, and the service fee. The table rows indicate each customer payment and include information corresponding to the table column headings. In other words, each table row corresponds to a customer payment and includes information relating to the creditor, the customer account number, the amount paid by the customer and the service fee. With reference to FIG. 3, the customer last name is entered in the appropriate field on screen 18 at step 28 wherein the agent system determines at step 30 whether or not that customer has been previously entered into the agent system (i.e., whether or not that customer has previously made a payment at the agent site). The agent system examines stored transaction information for entries matching the customer last name. When entries matching the customer last name are encountered, the matching entries are displayed in a list for selection. The appropriate customer name from the list is selected wherein the agent system displays the customer information in the appropriate fields on screen 18 at step 32.

Figure 8:
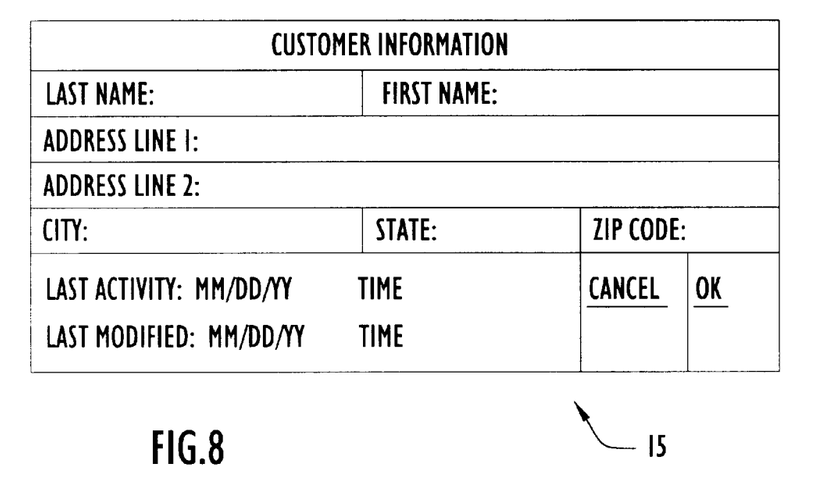
FIG. 8 is an exemplary illustration of an agent system computer screen for entering customer information according to the present invention.

When a customer has not been previously entered into the agent system, the agent system prompts the operator for customer information and displays a customer entry screen 15 as illustrated by way of example in FIG. 8. Specifically, screen 15 includes fields for receiving the customer first and last names, address (e.g., street, city, state and zip code wherein the screen includes fields for receiving two street addresses), the date (e.g., in an MM/DD/YY format wherein M indicates the month, D indicates the day and Y indicates the year) and time of the last customer activity, and the date (e.g., in an MM/DD/YY format as described above) and time of the last customer information modification for the customer. Referring back to FIG. 3, the customer information is entered into the appropriate fields on screen 15 at step 34 wherein depressing the "Enter" or "Return" keyboard key after selecting the "OK" box disposed toward the bottom of screen 15 (e.g., via the keyboard keys and/or mouse as known in the computer arts) saves the customer information and displays screen 18, while selecting the "Cancel" box (i.e., adjacent the "OK" box) and depressing the "Enter" or "Return" keyboard keys displays screen 18 without saving the entered customer information. The customer number is generated by the agent system to uniquely identify the customer, and automatically appears in the appropriate field on screen 18 after the customer information is entered and saved on screen 15 as described above. Alternatively, screen 15 may be displayed upon depressing the "F2" (Add) function key from screen 18 to enter customer information for a customer that has not been previously entered into the agent system in substantially the same manner described above.

Figure 7:
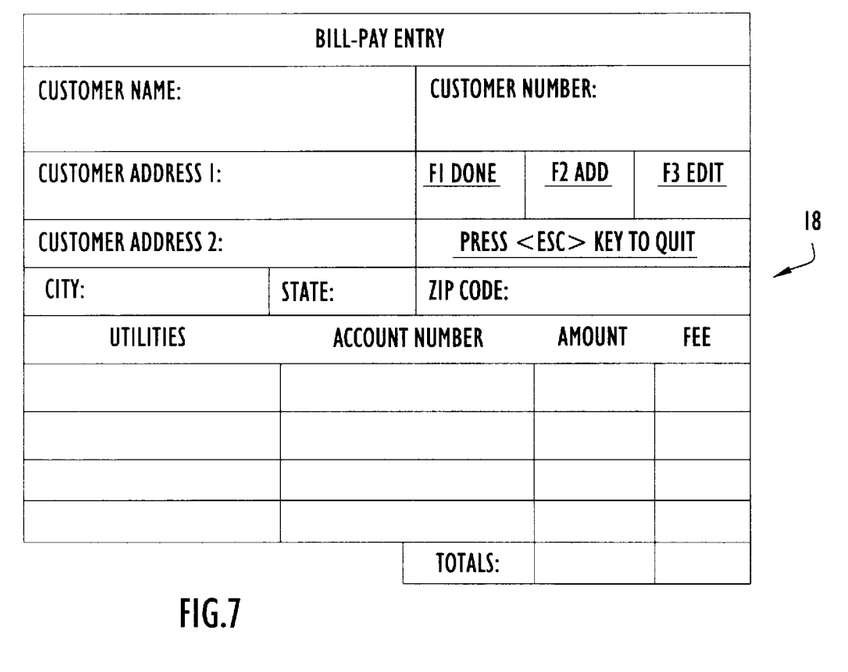
FIG. 7 is an exemplary illustration of an agent system computer screen for entering customer payment transaction information according to the present invention.

Once the customer information is displayed on screen 18, the operator determines at step 36 whether or not the customer information needs to be modified. When the operator decides that the customer information needs to be modified, the "F3" (Edit) function key is depressed from screen 18 wherein customer information may be entered in the appropriate fields on screen 18. After the customer information is modified, customer account numbers are entered in the appropriate fields on screen 18. The customer account numbers for a first time customer are entered twice for verification purposes. If a customer is already entered in the system, the account numbers are automatically displayed in the appropriate table fields on screen 18. The operator verifies that the customer account numbers are correct at step 38 wherein any errors encountered are corrected at step 40 by depressing the "F3" (Edit) function key and re-entering the account information in the appropriate fields on screen 18 as described above.

Figure 9:
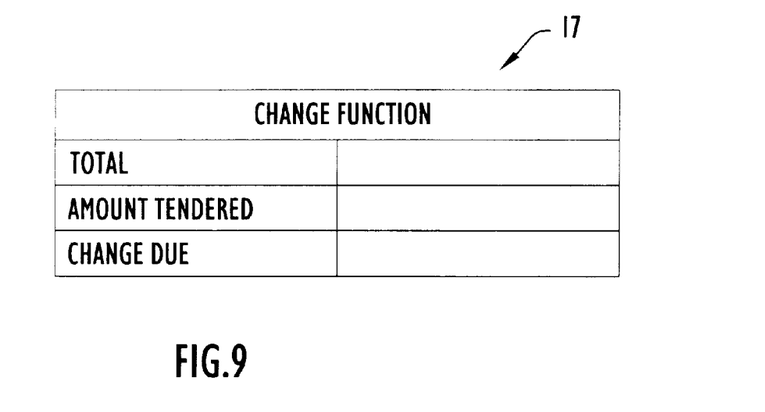
FIG. 9 is an exemplary illustration of an agent system computer screen for showing the change due a customer in relation to a customer tendered payment according to the present invention.
Figure 10:
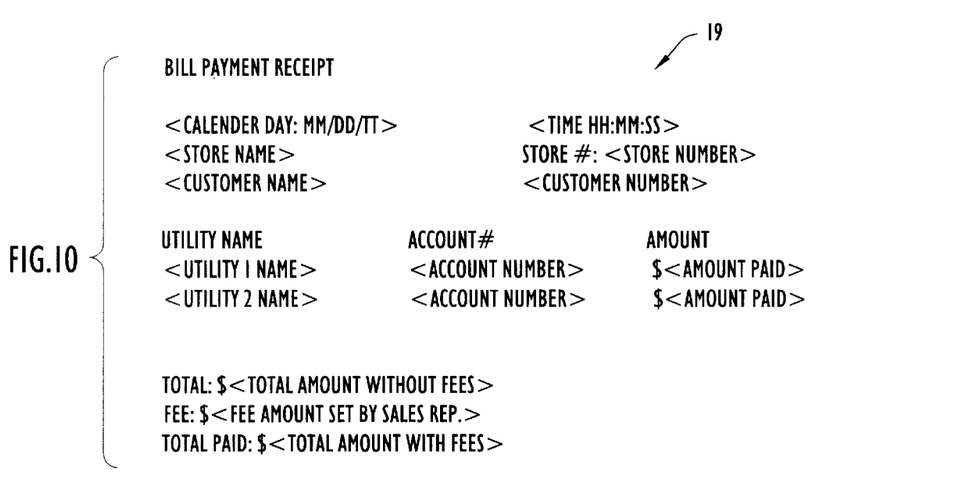
FIG. 10 is an exemplary illustration of a receipt generated by an agent computer system containing customer payment transaction information according to the present invention.

After the customer and customer account information are verified, the amount the customer is paying to each creditor is entered at step 42 (FIG. 4) in the appropriate table fields on screen 18. Once the payment information for each creditor is entered, depressing the "F1" (Done) function key enables agent system 4 to calculate the total of the customer payments and service fees and display at step 44 the total payment amount due to the agent on a "change due" screen 17 as illustrated by way of example in FIG. 9. The agent system only displays the "change due" screen when the screen is enabled by the "Store Options" function described above. Further, the entered transaction information on screen 18 may be erased and not saved within the agent system by depressing the escape (i.e., "Esc") key from screen 18 prior to entry of customer payment information and depression of the "F1" (Done) function key described above. Specifically, screen 17 includes fields for the total amount due to the agent (i.e., the total of the amounts being paid to creditors and service fees), the amount tendered by the customer, and the change due the customer (i.e., the amount tendered minus the total amount due to the agent). Referring back to FIG. 4, upon initial display of screen 17, the total amount due to the agent is calculated by the agent systems and automatically appears in the appropriate field wherein the customer tendered amount is subsequently entered in the appropriate field on screen 17 at step 46. Upon entry of the customer tendered amount, the agent system automatically calculates and displays in the appropriate field on screen 17 any change due the customer at step 48. After the payment transaction has been entered, depressing the "Enter" or "Return" key directs the system to generate at step 50 a receipt 19 as illustrated by way of example in FIG. 10. The receipt is only generated when the "Store Options" function enables generation of the receipt as described above. Further, the text delineated by the brackets '[ ]' in the figure is not actually included in the receipt, but indicates the type of information that does appear in the receipt for that field. Specifically, receipt 50 typically contains information related to the date (e.g., in an MM/DD/YY format as described above) and time (e.g., in an HH:MM:SS format wherein H indicates the hour, M indicates the minute and S indicates the second) of the transaction, the agent name and number, the customer name and customer identification number described above, the total amount paid by the customer, the total service fees, and the total amount due to the agent (i.e., total of payments to creditors and service fees). Further, the receipt includes a table having column headings indicating the creditor name, customer account number and amount paid. The table rows indicate the customer payments to each creditor wherein each row represents a customer payment and includes information relating to the customer account number and amount paid to a particular creditor.

Alternatively, customer payment processing may be performed in substantially the same manner described above except that the customer and other related information may be entered into agent system 4 via a scanner. Specifically, the customer receives the creditor billing statement as described above, and transports the statement to an agent site. Agent system 4 preferably includes a scanner that reads the relevant customer information from the billing statement, thereby facilitating automatic entry of customer and other related information (e.g., amount due to the creditor, account numbers, creditor name, customer name and address, etc.) into the agent system. The scanner may be any type of scanner capable of gathering input in any coded or uncoded format, such as a bar code reader or optical character recognition scanner. Similarly, the billing statement may be generated for compatibility with the particular scanner employed by the agent system. For example, when a bar code scanner is being employed by the agent system, the creditor billing statement includes bar codes in prescribed fields containing the relevant information such that the bar code scanner reads the information directly from the billing statement into the agent system. Alternatively, the information may be alphanumeric characters disposed in prescribed fields, and readable by the scanner and computer arrangement.

Figure 11:
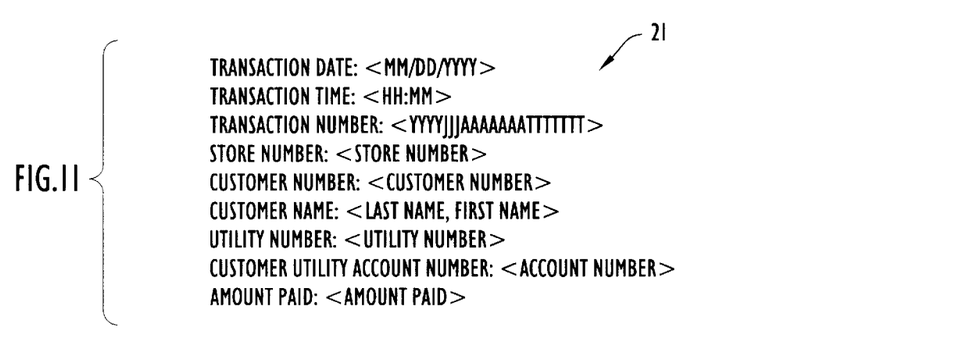
FIG. 11 is an exemplary illustration of a record structure utilized by an agent computer system to maintain customer payment transaction information according to the present invention.

Referring back to FIG. 4, the agent system repeatedly processes customer payments as described above until the agent site closes for business or some other predetermined time arrives as set by the service provider in the "Systems Options" function in the manner described above. When the system determines at step 52 that closing time has arrived, agent system 4 dials or contacts host system 6 at step 54, via modem or other communications medium, in order to transfer the daily transaction information (i.e., information relating to each payment transaction that occurred during the day) to the host system. If the agent system determines at step 56 that the communication line to the host system is busy, the agent system waits at step 58 for a predetermined time interval, preferably one minute, before attempting to re-access the host system. When agent system 4 establishes a connection to host system 6, the agent system transfers at step 60 a file containing the daily transaction information. The transaction file includes a plurality of records, with each record 21 having information pertaining to a particular transaction as illustrated by way of example in FIG. 11. The text delineated by brackets '[ ]' in the figure indicates the type of information appearing in the record field as described above. Specifically, record 21 contains information relating to the transaction date (e.g., in an MM/DD/YYYY format as described above) and time (e.g., in an HH:MM format wherein H indicates the hour and M indicates the minute), the transaction number (e.g., in a YYYYJJJAAAAAAAATTTTTTT format wherein Y indicates the year, J indicates the Julian date, A indicates the agent number and T indicates the transaction number), the agent number, the customer name (e.g., last name, first name), the customer identification number described above, the creditor number (i.e., a number identifying a particular creditor), the customer account number and the amount paid by the customer.

Figure 5:
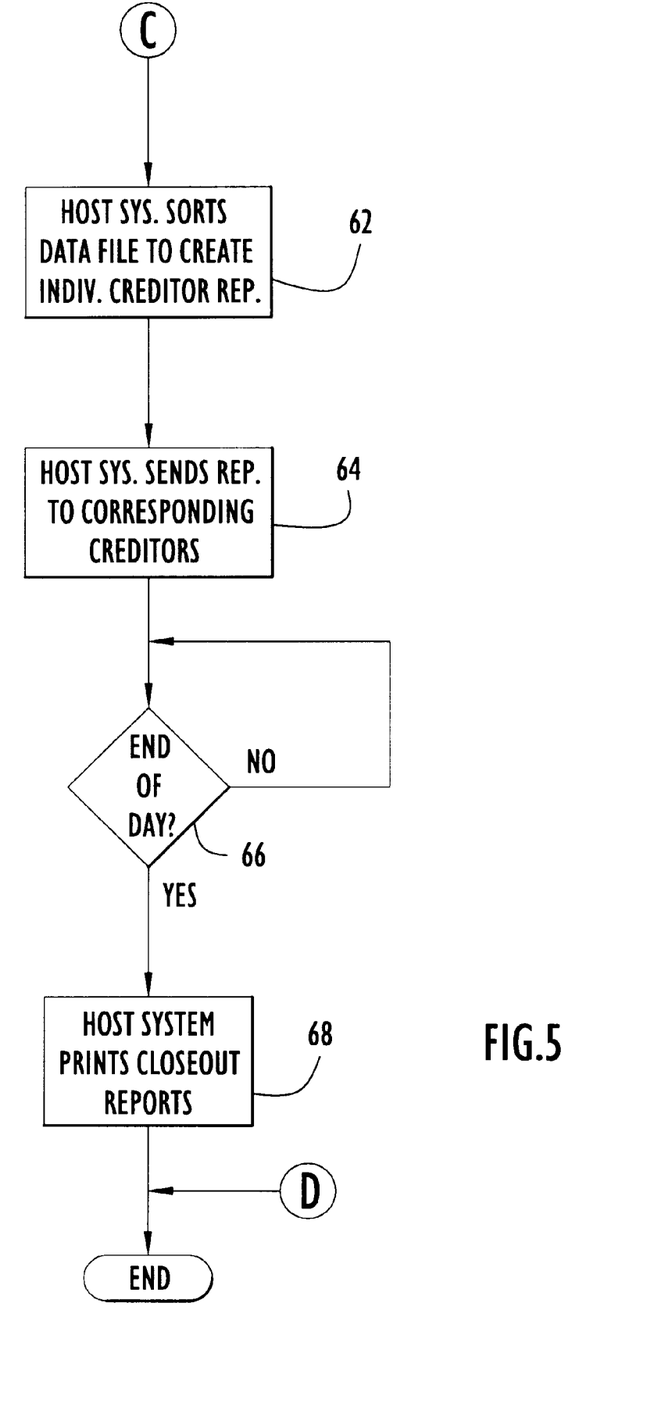
Figure 12:
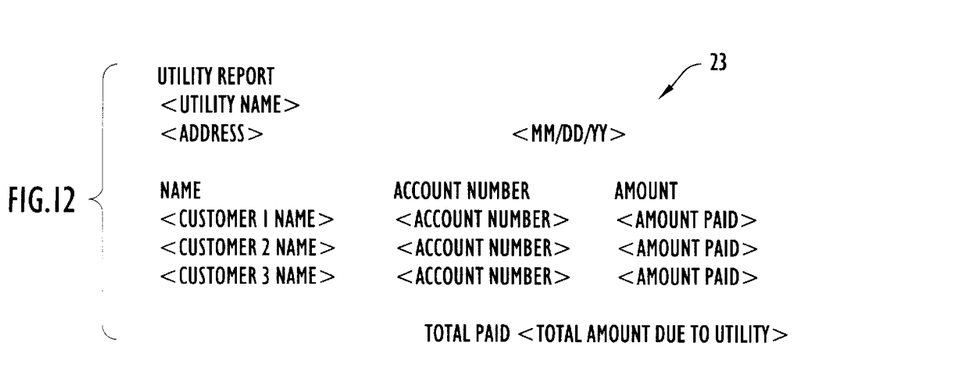
FIG. 12 is an exemplary illustration of a creditor report generated by a host computer system containing customer payment transaction information associated with an individual creditor according to the present invention.

Referring to FIG. 5, upon receipt of the payment transaction information from each agent system, the host system generates at step 62 a creditor report 23 for each individual creditor as illustrated by way of example in FIG. 12. The text delineated by brackets '[ ]' in the figure indicates the type of information appearing in the report field as described above. Specifically, host system 6 receives a transaction file from each agent system as described above. Host system 6 examines each record 21 (FIG. 11) in the file and retrieves the creditor, customer name, customer account and amount paid information. The host system then sorts the retrieved information based on the particular creditor such that all transactions related to a specific creditor are grouped together to form an individual report. The individual reports for the respective creditors affiliated with the service provider contain information relating to the creditor name and address, the date (e.g., in an MM/DD/YY format as described above) of the report, a table including the customer transactions for the creditor, and the total amount due to the creditor. The table includes column headings indicating the customer name, customer account number and amount paid, while each table row indicates a customer payment and specifies the amount a particular customer paid to the creditor. Host system 6 automatically calculates the total amount due to the creditor and places the amount in the creditor report below the table. Referring back to FIG. 5, when a report is generated by the host system for each creditor affiliated with the service provider, the reports are sent to the appropriate creditors at step 64. The reports are typically sent to the creditors via communications between host system 6 and creditor systems 8. However, the host system may send the reports to the creditors in any conventional manner, such as mail, facsimile or other transport facilities. The service provider subsequently remits payment to the respective creditors in accordance with the creditor report totals via check, electronic fund transfer or in any other agreed upon conventional manner.

Figure 13:
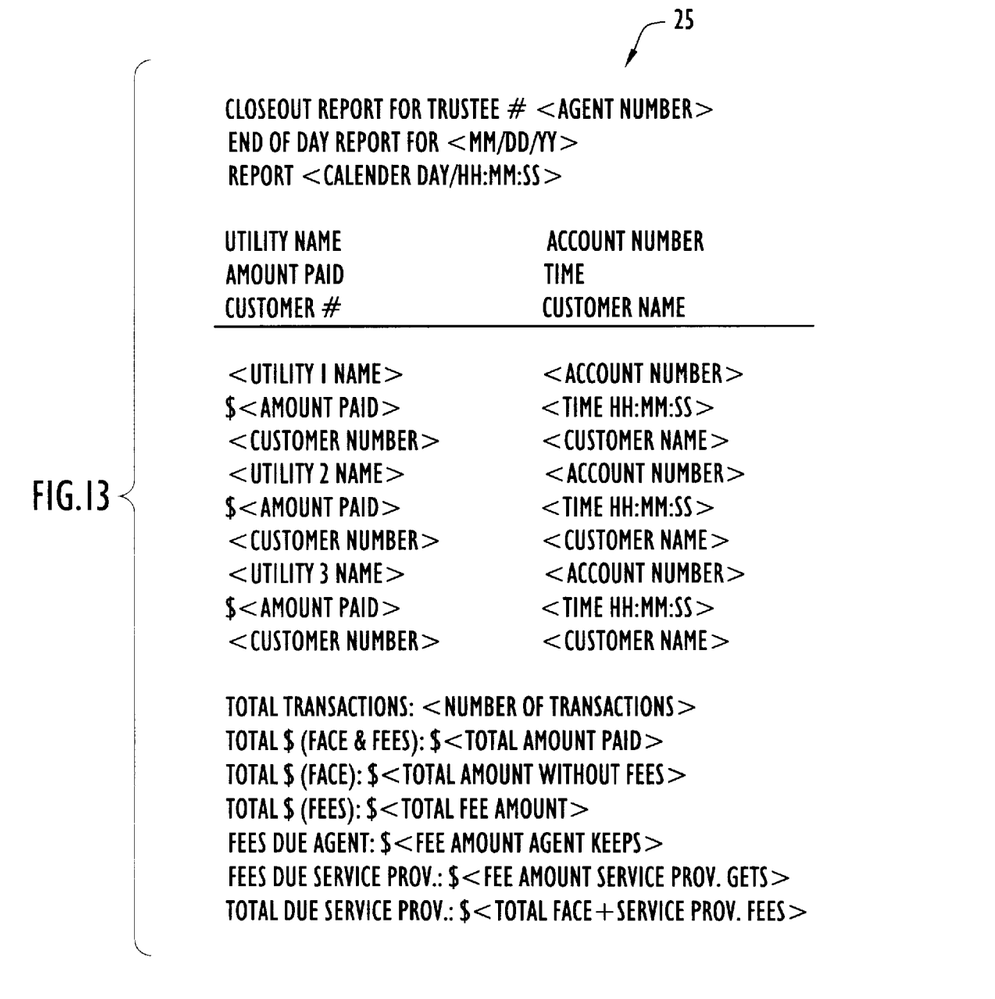
FIG. 13 is an exemplary illustration of a closeout report generated by a host computer system containing daily customer payment transaction information according to the present invention.

After the creditor reports are generated, host system 6 determines at step 66 whether or not a predetermined reporting time (e.g., the end of the day) has arrived. The predetermined time is set by the "Store Options" function described above. When the host system determines that the end of the day has arrived, the host system generates at step 68 a closeout report 25 as illustrated by way of example in FIG. 13. The text delineated by brackets '[ ]' in the figure indicates the type of information appearing in the report field as described above. Closeout report 25 is generated based on the information in the transaction files received from each agent system. Specifically, closeout report 25 includes information related to each respective agent site. The information included in the report for each respective agent site is related to the agent number, the day for which the report is generated (e.g., in an MM/DD/YY date format as described above), the date (e.g., the calendar day) and time (e.g., in an HH:MM:SS format described above) that the report is generated, and for each transaction at the respective agent site, the creditor name, the customer account number, the amount paid, the time (e.g., in an HH:MM: SS format described above) of the transaction, the customer name and the customer identification number. In addition, the host system calculates totals pertaining to the payment transactions based on the relevant information in the transaction files wherein the closeout report further includes for each respective agent site the total number of transactions, the total amount paid by customers including service fees (i.e., total of face amounts and service fees), the total amount paid by customers excluding service fees (i.e., the total face amount), the total amount of service fees and the service fees due to the agent and service provider, and the total amount due to the service provider (i.e., amount of customer payments and the portion of the fees due to the service provider). In accordance with the closeout reports, the service provider deducts payment from the agents' bank accounts via host computer system 6 or other device, or receives payments from the agents in any other conventional pre-arranged manner.

The software for the present invention may be implemented in any of a number of computer programming languages. It is to be understood that one of ordinary skill in the computer arts can develop the software based on the foregoing description and flow charts.

Although the present invention has been described primarily in relation to a creditor paying system, the system may be utilized for various other applications. For example, the system may be employed for money order or telephone card (e.g., pre-paid cards enabling the card holder to place telephone calls incurring fees up to the pre-paid amount) purchases at an agent site. The system is substantially similar to, and functions in substantially the same manner as, the system described above except that the agent system further includes a peripheral printer or other device to generate the money order or telephone card, respectively. The agent system processes the purchases and transmits the information to the host system as described above. The host system, in turn, processes the information to generate and transmit reports to the money order or telephone company, respectively. The service provider pays the money order and/or telephone companies and receives payment from the agents in substantially the same manner described above.

It will be appreciated that the embodiments described above and illustrated in the drawings represent only a few of the many way of implementing the customer payment system.

The computer systems may be implemented by any type of computer system (e.g., personal computer, mini or microcomputer, microprocessor, main frame, etc.) or processor and monitor capable of processing and communicating transaction information. Further, the host system may be implemented by a mainframe having terminals located at the agent sites wherein the mainframe does all the processing of payment information on-line as the information is entered at the terminals, the processing being carried out in substantially the same manner described above. The creditor computer systems may also be mainframe computers utilized by the creditor to process customer accounts wherein the creditor reports may be sent to the mainframe from the host system for automatic updating of customer accounts. Alternatively, the creditor computer system may be a personal or other computer system for receiving the creditor report from the host system, wherein the receiving computer may either transmit the report to a creditor processing system for updating customer accounts, or print the report for data entry into the creditor processing system. The computer system screens may be arranged in any fashion and contain any desired information. Further, the screens may be implemented by windows, graphical user interfaces, line prompting or any other data entry and display techniques. Moreover, any keystroke or input device may be utilized to initiate the various screen functions (e.g., mouse, voice, etc.). Communications between the computer systems may be accomplished by any techniques capable of transmission and reception of the transaction information. The creditor reports may be sent to the creditor from the service provider site via the creditor and host computer systems or any other transport method, such as facsimile (e.g., host system to facsimile or faxing a hard copy of the report), or mailing or transporting hardcopy of the report to the creditor.

The agent systems may employ any type of scanner for reading information directly from a billing statement or other form wherein the creditor billing statements or other forms may be printed or encoded in any manner capable of being read by any type of scanner utilized by the agent system for system data entry.

The transaction information may be stored in a database, file, data structure or any other software construct capable of maintaining transaction information.

From the foregoing description it will be appreciated that invention makes available a novel method and apparatus for facilitating customer payments to creditors from a remote site wherein the system facilitates customer payments in any payment form (e.g., cash, credit card, etc.) to various creditors from a local remote site, preferably a retail establishment, by interacting with a service provider to inform the creditor of the customer payments at the remote site and enable the creditor to update corresponding customer accounts.

Having described preferred embodiments of a new and improved method and apparatus for facilitating customer payments to creditors from a remote site, it is believed that other modifications, variations and changes will be suggested to those skilled in the art in view of the teachings set forth herein. It is therefore to be understood that all such variations, modifications and changes are believed to fall within the scope of the present invention as defined in the appended claims.

What is claimed is:

1. Apparatus for enabling customers of a plurality of creditors to visit a remote site and manually tender payment in response to receiving from at least one of said creditors a creditor billing statement including a customer account balance owed to a corresponding creditor, wherein customer payments tendered at said remote site are applied to corresponding customer account balances and at least two of said customer payments are directed to different creditors, said apparatus comprising:

agent processing means, disposed at said remote site, for processing said customer payments manually tendered at said remote site and storing customer payment information relating to said customer payments, wherein said agent processing means includes transmission means for transmitting to a service provider site, at selected transmission times, said customer payment information accumulated between said transmission times;

host processing means, disposed at said service provider site, for receiving said accumulated customer payment information from said agent processing means and including:

creditor report means for generating a creditor report for at least two of said creditors including creditor collection information relating to each of said customer payments tendered at said remote site for the respective creditors, wherein said creditor report means includes:

data extraction means for processing said received accumulated information to retrieve creditor collection information contained within said received accumulated information;

data examining means for examining creditor information contained within said retrieved information to identify a plurality of creditors associated with said retrieved information;

data format means for comparing creditor information associated with each customer payment contained within said retrieved creditor collection information to said identified creditors to arrange said retrieved information into at least two creditor sections with each creditor section including said creditor collection information associated with a different creditor, wherein said creditor collection information contained within the same creditor section is associated with the same creditor; and report generation means for generating said creditor report for said at least two creditors to include the creditor section associated with that creditor; and report transmission means for transmitting said creditor report for each of said at least two creditors to the corresponding creditor; and a plurality of creditor processing means with each creditor processing means disposed at a respective creditor site for receiving said creditor report associated with said respective creditor from said host processing means and processing said creditor collection information to update said corresponding customer account balances based on the customer payments tendered at said remote site.

2. The apparatus of claim 1 wherein said host processing means further includes closeout report means for generating a closeout report at predetermined reporting times including information relating to all of the customer payments tendered at said remote site.

3. The apparatus of claim 2 further comprising:

a plurality of agent processing means with each agent processing means disposed at a respective remote site for processing customer payments received at said respective remote site and storing respective customer payment information, wherein each of said agent processing means transmits to said service provider site at selected transmission times associated with that agent processing means said customer payment information accumulated between said associated transmission times;

wherein said host processing means further includes means for receiving customer payment information from each of said agent processing means, said creditor report means further includes means for generating said creditor report for said at least two creditors including said creditor collection information relating to customer payments tendered at each remote site for the respective creditors, and said closeout report means includes means for generating said closeout report to include information relating to all customer payments tendered at each remote site.

4. The apparatus of claim 1 wherein said agent processing means further includes means for storing said accumulated customer payment information in a file for transmission to said host processing means.

5. The apparatus of claim 1 wherein said agent processing means further includes a scanner for scanning a customer item including customer information and transferring said customer information relating to a corresponding customer payment from said customer item into said agent processing means.

6. The apparatus of claim 5 wherein said customer item includes said creditor billing statement.

7. The apparatus of claim 1 wherein said agent processing means further includes receipt generation means for selectively generating a customer receipt in response to each of said customer payments.

8. The apparatus of claim 1 wherein said agent processing means further includes termination means for disabling said agent processing means in response to determining that said agent processing means has failed to transfer said customer payment information to said service provider site within a predetermined time interval.

9. The apparatus of claim 1 wherein said agent processing means further includes communication means for initiating communications with said host processing means at said selected transmission times to transmit said customer payment information to said service provider site, wherein said communication means includes timer means for delaying initiation of communications with said host processing means for a predetermined time interval in response to a prior failure of said communication means to establish communications with said host processing means.

10. The apparatus of claim 1 wherein a repeat customer visits said remote site to manually tender a second payment, and said agent processing means further includes data retrieval means for retrieving customer payment information associated with said repeat customer and stored in response to a prior payment to reduce entry of customer information and facilitate processing of said second payment.

11. The apparatus of claim 1 wherein said agent processing means further includes voice means for receiving voice signals and facilitating processing of said customer payments by said agent processing means in response to said voice signals.

12. Apparatus for enabling customers to visit a remote site and manually tender payment to purchase money orders, wherein customer payments tendered at said remote site are associated with a money order provider located at a creditor site, said apparatus comprising:

agent processing means, disposed at said remote site, for processing said customer payments manually tendered at said remote site and storing customer payment information relating to said customer payments, wherein said agent processing means includes:

transmission means for transmitting to a service provider site, at selected transmission times, said customer payment information accumulated between said transmission times; and money order generation means for generating said money orders in response to each of said customer payments for said money orders; and host processing means, disposed at said service provider site, for receiving said accumulated customer payment information from said agent processing means and including:

report means for generating a report for said money order provider including collection information relating to customer payments tendered at said remote site for said money orders; and report transmission means for transmitting said report to said money order provider located at said creditor site.

13. Apparatus for enabling customers to visit a remote site and manually tender payment to purchase telephone cards, wherein customer payments tendered at said remote site are associated with a telephone company located at a creditor sites said apparatus comprising:

agent processing means, disposed at said remote site, for processing said customer payments manually tendered at said remote site and storing customer payment information relating to said customer payments, wherein said agent processing means includes:

transmission means for transmitting to a service provider site, at selected transmission times, said customer payment information accumulated between said transmission times; and telephone card generation means for generating said telephone cards in response to each of said customer payments for said telephone cards; and host processing means, disposed at said service provider site, for receiving said accumulated customer payment information from said agent processing means and including:

report means for generating a report for said telephone company including collection information relating to customer payments tendered at said remote site for said telephone cards; and report transmission means for transmitting said report to said telephone company located at said creditor site.

14. A method for enabling customers of a plurality of creditors to visit a remote site and manually tender payment in response to receiving from at least one of said creditors a creditor billing statement including a customer account balance owed to a corresponding creditor, wherein each said creditor is associated with a respective creditor site and customer payments tendered at said remote site are applied to corresponding customer account balances, and wherein at least two of said customer payments are directed to different creditors, said method comprising the steps of:

(a) receiving customer payments at said remote site from customers visiting said remote site and manually tendering said customer payments;

(b) processing said customer payments and storing customer payment information relating to said customer payments via a remote processing system disposed at said remote site;

(c) transmitting to a service provider site, at selected transmission times, said customer payment information accumulated between said transmission times;

(d) receiving at said service provider site said accumulated customer payment information from said remote site and processing said received customer payment information, via a host processing system, to generate a creditor report for at least two of said creditors including creditor collection information relating to each of said customer payments tendered at said remote site for the respective creditors, and wherein step (d) further includes:

(d.1) processing said received accumulated information to retrieve creditor collection information contained within said received accumulated information;

(d.2) examining creditor information contained within said retrieved information to identify a plurality of creditors associated with said retrieved information;

(d.3) comparing creditor information associated with each customer payment contained within said retrieved creditor collection information to said identified creditors to arrange said retrieved information into at least two creditor sections with each creditor section including said creditor collection information associated with a different creditor, wherein said creditor collection information contained within the same creditor section is associated with the same creditor; and (d.4) generating said creditor report for said at least two creditors to include the creditor section associated with that creditor;

(e) sending said creditor report for each of said at least two creditors from said host processing system to the corresponding creditor; and (f) receiving at each said respective creditor site said creditor report for the respective creditor associated with that creditor site and processing said creditor collection information at each said respective creditor site, via a creditor processing system, to update said corresponding customer account balances based on said customer payments tendered at said remote site.

15. The method of claim 14 wherein step (b) further includes:

(b.1) storing said accumulated customer payment information in a file; and step (c) further includes:

(c.1) transmitting said file to said service provider site at said transmission times.

16. The method of claim 14 wherein step (d) further includes:

(d.5) processing said received customer payment information, via said host processing system, to generate a closeout report at predetermined reporting times including information relating to all of the customer payments tendered at said remote site.

17. The method of claim 16 wherein a plurality of respective remote sites receive customer payments, and step (a) further includes:

(a.1) receiving customer payments at said respective remote sites from customers visiting said respective remote sites and manually tendering said customer payments;

wherein step (b) further includes:

(b.1) processing said customer payments and storing customer payment information relating to said customer payments received at said respective remote sites via remote processing systems disposed at each respective remote site;

wherein step (c) further includes:

(c.1) transmitting from each respective remote site to said service provider site at selected transmission times associated with each remote site said customer payment information accumulated between said associated transmission times;

wherein step (d) further includes receiving at said service provider site said accumulated customer payment information from said respective remote sites and generating said creditor report for said at least two creditors to include creditor collection information relating to customer payments tendered at each remote site for the respective creditors, and generating said closeout report to include information relating to all customer payments tendered at each remote site.

18. The method of claim 14 wherein said remote processing system includes a scanner and step (b) further includes:

(b.1) scanning a customer item including customer information with said scanner at said remote site and transferring said customer information relating to a corresponding customer payment from said customer item into said remote processing system.

19. The method of claim 18 wherein said customer item includes said creditor billing statement, and step (b.1) further includes:

(b.1.1) scanning said creditor billing statement including customer information with said scanner at said remote site and transferring said customer information relating to a corresponding customer payment from said creditor billing statement into said remote processing system.

20. The method of claim 14 wherein step (b) further includes:
  (b.1) selectively generating a customer receipt in response to each of said customer payments.

21. The method of claim 14 wherein step (c) further includes:
  (c.1) disabling said remote processing system in response to determining that said customer payment information has not been transferred to said service provider site within a predetermined time interval.

22. The method of claim 14 wherein step (c) further includes:
  (c.1) initiating communications between said remote processing system and said host processing system at said selected transmission times, via said remote processing system, to transmit said customer payment information to said service provider site; and
  (c.2) delaying initiation of said communications for a predetermined time interval in response to a prior failure of said remote processing system to establish communications with said host processing system.

23. The method of claim 14 wherein:
  step (a) further includes:
  (a.1) receiving a second payment at said remote site from a repeat customer visiting said remote site to manually tender said second payment; and
  step (b) further includes:
  (b.1) retrieving customer payment information associated with said repeat customer and stored in response to a prior payment to reduce entry of customer information and facilitate processing of said second payment.

24. The method of claim 14 wherein said remote processing system includes a voice responsive device, and step (b) further includes:
  (b.1) receiving voice signals and facilitating processing of said customer payments by said remote processing system in response to said voice signals via said voice responsive device.

25. A method for enabling customers to visit a remote site and manually tender payment to purchase money orders wherein customer payments tendered at said remote site are associated with a money order provider located at a creditor site, said method comprising the steps of:
  (a) receiving customer payments at said remote site from customers visiting said remote site and manually tendering said customer payments;
  (b) processing said customer payments and storing customer payment information relating to said customer payments via a remote processing system disposed at said remote site, wherein step (b) further includes:
    (b.1) generating said money orders in response to each of said customer payments for said money orders;
  (c) transmitting to a service provider site, at selected transmission times, said customer payment information accumulated between said transmission times;
  (d) receiving at said service provider site said accumulated customer payment information from said remote site and processing said customer payment information, via a host processing system, to generate a report for said money order provider including collection information relating to customer payments tendered at said remote site for the money orders; and
  (e) sending said report to said money order provider located at said creditor site.

26. A method for enabling customers to visit a remote site and manually tender payment to purchase telephone cards, wherein customer payments tendered at said remote site are associated with a telephone card provider located at a creditor site, said method comprising the steps of:
  (a) receiving customer payments at said remote site from customers visiting said remote site and manually tendering said customer payments;
  (b) processing said customer payments and storing customer payment information relating to said customer payments via a remote processing system disposed at said remote site, wherein step (b) further includes:
    (b.1) generating said telephone cards in response to each of said customer payments for said telephone cards;
  (c) transmitting to a service provider site, at selected transmission times, said customer payment information accumulated between said transmission times;
  (d) receiving at said service provider site said accumulated customer payment information from said remote site and processing said customer payment information, via a host processing system, to generate a report for said telephone card provider including collection information relating to customer payments tendered at said remote site for the telephone cards; and
  (e) sending said report to said telephone card provider located at said creditor site.

27. A method for enabling customers of creditors to visit a remote site and manually tender customer payments in response to receiving from a first creditor a creditor billing statement including customer account balance information wherein customer payments tendered at said remote site are applied to respective customer account balances, said method comprising the steps of:
  (a) receiving customer payments at said remote site from customers visiting said remote site and manually tendering customer payments;
  (b) processing said customer payments at said remote site, via a remote processing system, to store customer payment information relating to said customer payments and to transfer said customer payment information from said remote site to a central processing site;
  (c) disabling said remote processing system in response to determining that said remote processing system has failed to transfer said customer payment information to said central processing site within a predetermined time interval; and
  (d) processing said customer payment information received at said central processing site from said remote site and informing said first creditor that customer payments have been tendered at said remote site such that said first creditor updates said respective customer account balances based on the customer payments tendered at said remote site.

28. Apparatus for enabling customers of creditors to visit a remote site and manually tender payment in response to receiving from a first creditor a creditor billing statement including customer account balance information wherein customer payments tendered at said remote site are applied to respective customer account balances, said apparatus comprising:
  agent processing means, disposed at said remote site, for processing said customer payments to store customer payment information relating to said customer payments, wherein said agent processing means includes transmission means for transferring said customer payment information from said remote site to a central processing site and termination means for disabling said agent processing means in response to determining that said agent processing means has failed to transfer said customer payment information to said central processing site within a predetermined time interval;

host processing means, disposed at said central processing site, for processing said customer payment information received at said central processing site from said remote site and informing said first creditor of associated customer payments that have been tendered at said remote site; and creditor processing means, disposed at a site of said first creditor and responsive to said host processing means, for updating said respective customer account balances based on the associated customer payments tendered at said remote site.

* * * * *